(12) United States Patent
Komuro et al.

(10) Patent No.: US 8,540,403 B2
(45) Date of Patent: Sep. 24, 2013

(54) ILLUMINATION DEVICE, ELECTRONIC APPARATUS INCLUDING THE SAME, AND METHOD OF MANUFACTURING ILLUMINATION DEVICE

(75) Inventors: Takeshi Komuro, Kawasaki (JP); Manabu Hongo, Kawasaki (JP); Wataru Murata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 282 days.

(21) Appl. No.: 12/882,471

(22) Filed: Sep. 15, 2010

(65) Prior Publication Data
US 2011/0222300 A1  Sep. 15, 2011

(30) Foreign Application Priority Data
Sep. 16, 2009  (JP) .................................. 2009-214973

(51) Int. Cl.
*F21V 21/00* (2006.01)

(52) U.S. Cl.
USPC ...... 362/382; 362/249.02; 362/800; 362/612; 362/600

(58) Field of Classification Search
USPC ............... 362/600, 249.11, 249.02, 800, 613, 362/382
See application file for complete search history.

(56) References Cited

U.S. PATENT DOCUMENTS

| | | | | |
|---|---|---|---|---|
| 5,821,695 A | * | 10/1998 | Vilanilam et al. | 315/58 |
| 6,521,916 B2 | * | 2/2003 | Roberts et al. | 257/100 |
| 7,172,315 B2 | * | 2/2007 | Lamke et al. | 362/241 |

FOREIGN PATENT DOCUMENTS

| | | |
|---|---|---|
| JP | 5-54669 | 7/1993 |
| JP | 2002-64283 | 2/2002 |
| JP | 2004-7262 | 1/2004 |
| JP | 2008-49620 | 3/2008 |

OTHER PUBLICATIONS

Japanese Office Action mailed Jul. 23, 2012 for corresponding Japanese Application No. 2009-214973, with partial English-language translation.

* cited by examiner

*Primary Examiner* — Anabel Ton
(74) *Attorney, Agent, or Firm* — Fujitsu Patent Center

(57) ABSTRACT

An illumination device is provided including a light emitter; and a panel. The panel includes a recess configured to accept an optically transparent sealant that is illuminated by light from the light emitter. Moreover, the panel includes a hole in the recess that is sealed by the optically transparent sealant.

14 Claims, 6 Drawing Sheets

US 8,540,403 B2

ILLUMINATION DEVICE, ELECTRONIC APPARATUS INCLUDING THE SAME, AND METHOD OF MANUFACTURING ILLUMINATION DEVICE

CROSS-REFERENCE TO RELATED APPLICATIONS

This application is based upon and claims benefit of priority to prior Japanese Patent Application No. 2009-214973, filed on Sep. 16, 2009, the entire contents of which are incorporated herein by reference.

BACKGROUND

1. Field

The embodiments discussed herein are related to an electronic apparatus including an illumination device, and a method of manufacturing an illumination device.

2. Description of the Related Art

Some electronic apparatuses include light emitters.

In some instances, such light emitters are enclosed in a housing, such as a panel, that functions as a casing for an electronic apparatus.

Japanese Unexamined Patent Application Publications No. 2002-64283 and No. 2004-7262 disclose processing techniques applicable to mobile phones.

SUMMARY

It is an aspect of the embodiments discussed herein to provide a light emitter; and a panel including a recess configured to accept an optically transparent sealant that is illuminated by light from the light emitter, and a hole therein that is sealed by the optically transparent sealant. It is to be understood that both the foregoing general description and the following detailed description are exemplary and explanatory and are not restrictive of the invention, as claimed.

DETAILED DESCRIPTION OF THE EMBODIMENTS

In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element layer between the two elements, or one or more intervening elements may also be present.

The appearance of light on a panel emitted from a light emitter is enhanced when a hole is formed in a region of the panel that is illuminated.

Thus, the aesthetics of an electronic apparatus may be improved to some extent.

However, providing a hole in a panel may permit water to enter the electronic apparatus or be retained within the hole, for example.

To inhibit and/or prevent water from entering through the hole provided in the panel of an electronic apparatus, for example, a water-blocking sheet may be pasted to the panel to seal the hole.

However, if a water-blocking sheet is pasted to the panel, the thickness of the panel may increase by the thickness of the water-blocking sheet.

As discussed below, an electronic apparatus may include a light emitter and a panel. The panel may include a recess configured to accept an optically transparent sealant that is illuminated by light from the light emitter, and a hole therein that is sealed by the optically transparent sealant.

A method of manufacturing an illumination device included in an electronic device is also discussed below. The method includes forming a recess in a panel; forming a hole therein; sealing the hole by filling the recess with an optically transparent resin; and positioning the panel to receive light in the recess that is illuminated from a light emitter.

An example embodiment of an electronic apparatus, for example, a mobile phone, will be described with reference to the accompanying drawings.

Figure 1A:
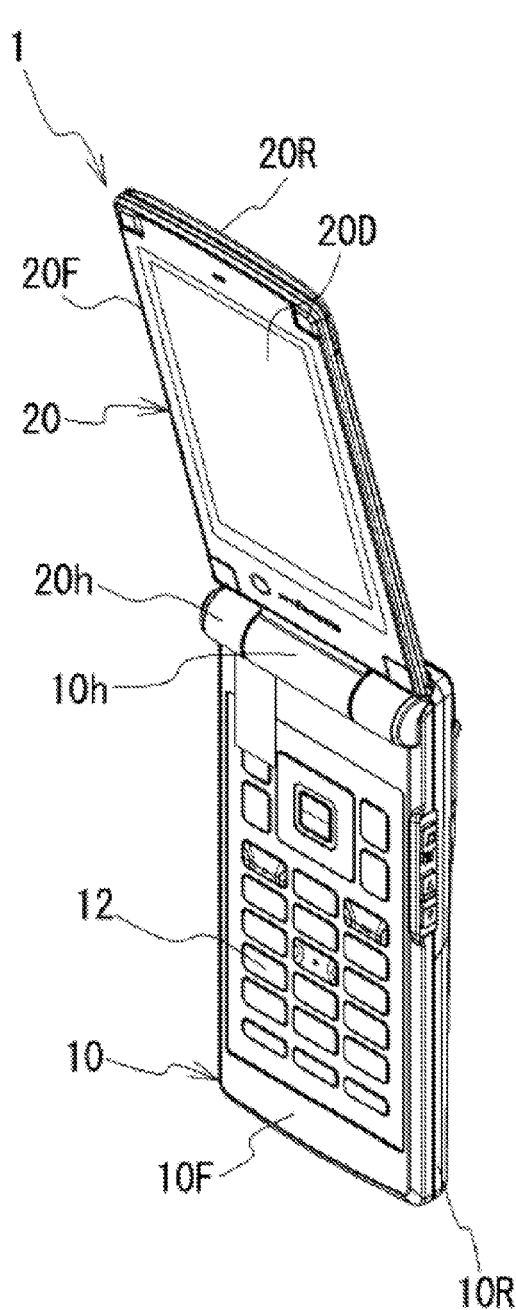
FIGS. 1A and 1B illustrate a mobile phone according to an embodiment.
Figure 1B:
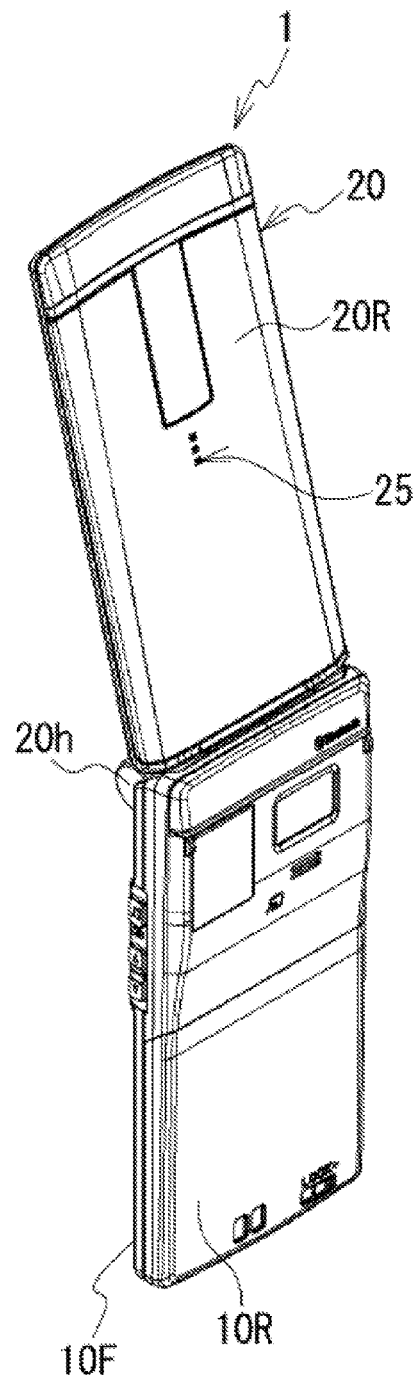

FIGS. 1A and 1B illustrate a mobile phone according to an embodiment.

A mobile phone 1 includes casings 10 and 20.

Casings 10 and 20 include hinge sections 10$h$ and 20$h$, respectively.

Casings 10 and 20 are rotatably connected to each other by hinge sections 10$h$ and 20$h$.

Thus, casings 10 and 20 are openable and closable to each other.

Casings 10 and 20 each house electronic components including a printed circuit board and the like.

Casing 10 includes a front panel 10F and a rear panel 10R.

Casing 20 includes a front panel 20F and a rear panel 20R.

The front panel 10F is provided with a plurality of operation keys 12, e.g. push buttons, for operating mobile phone 1. Front panel 20F is provided with a display 20D. Rear panel 20F includes hole groups 25.

Figure 2:
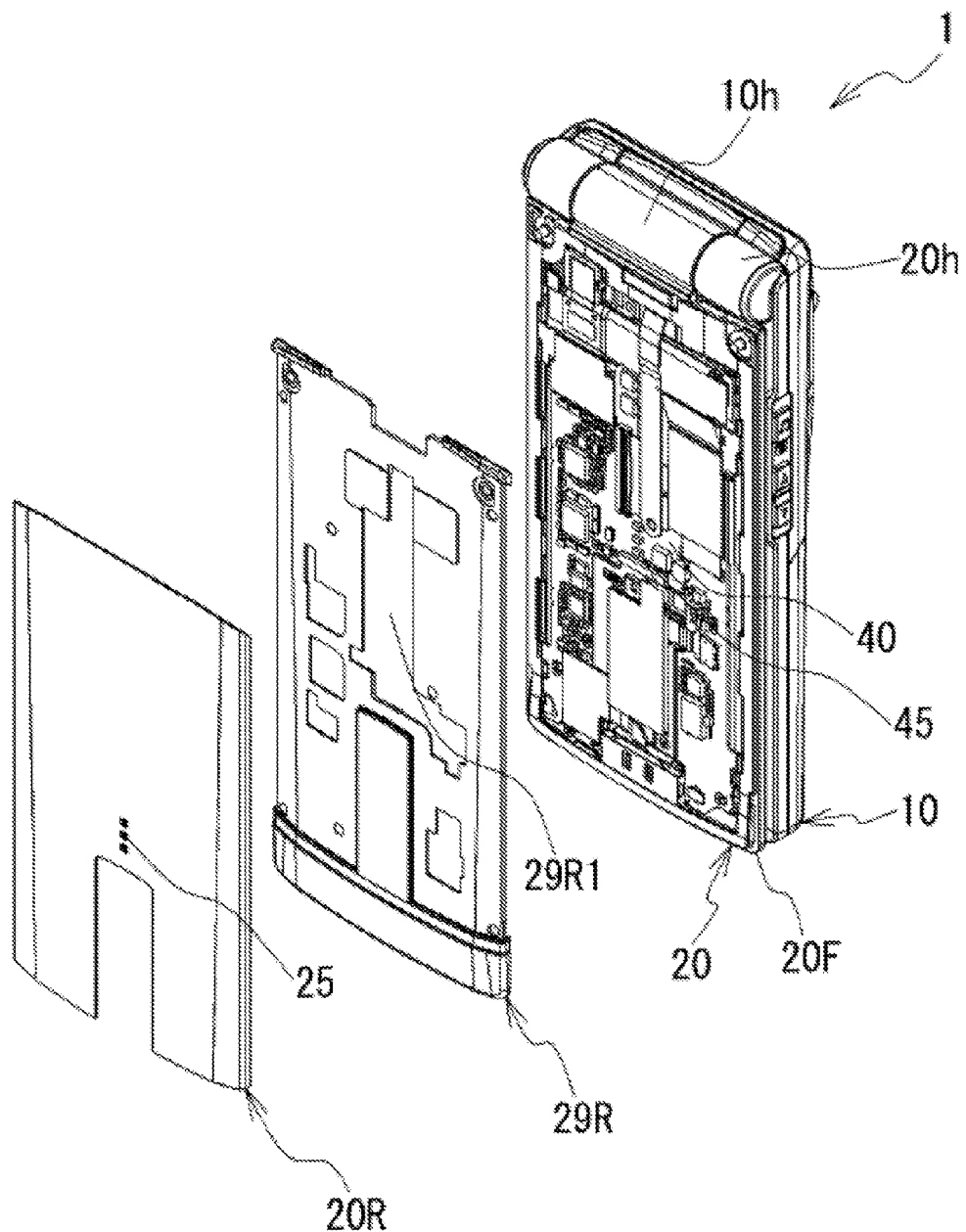
FIG. 2 is an exploded perspective view of the mobile phone according to the embodiment illustrated in FIGS. 1A and 1B.

FIG. 2 is an exploded perspective view of mobile phone 1.

FIG. 2 illustrates mobile phone 1 in a closed state. In the closed state shown in FIG. 2, the front panel 20$f$ of the casing 20 and the front panel 10$f$ illustrated in FIG. 1A of the casing 10 are facing each other and neither the front panel 20$f$ nor the operation keys 12 of the front panel 10$f$ are externally exposed.

FIG. 2 also illustrates a state wherein casing 20 is disassembled.

A portion of the casing may be referred to herein as a panel. Further, a portion of the casing 20, which is a panel, is referred to hereinafter as a panel body 21. The panel body 21 has a plurality of hole groups 25. Although not shown in FIG. 2 due to the depiction of the entire mobile phone 1, each of the hole groups 25 includes a plurality of holes (see FIG. 3).

The plurality of hole groups 25 include three hole groups arranged in the longitudinal direction of the rear panel surface 20R of the panel.

Hole groups 25 each include a plurality of holes (see FIG. 3).

An inner panel 29R fitted on the inner surface of rear panel 20R is assembled with front panel 20F.

The front panel 20F holds a printed circuit board 40.

The printed circuit board 40 is provided with a plurality of light-emitting diodes (LEDs) 45.

The number of LEDs 45 may correspond to the number of hole groups 25. For example, in FIG. 2, the number of LEDs 45 is equal to the number of hole groups 25.

The LEDs 45 are arranged at positions corresponding to the positions of the hole groups 25.

When the LEDs 45 emit light, the light travels through hole groups 25.

Accordingly, the light from the LEDs 45 illuminates the outside through the hole groups 25. Stated differently, the light from the LEDs 45 passes through the hole groups 25 and thus, can be viewed from a viewpoint external to the casing 20.

Thus, the aesthetic appearance of mobile phone 1 is improved.

Inner panel 29R includes an opening 29R1 so that the light from LEDs 45 is not blocked.

The panel body 21 and the LEDs 45 may be collectively referred to herein as an illumination device.

The rear panel surface 20R is made of and/or coated with a metal not having optical transparency.

Figure 3A:
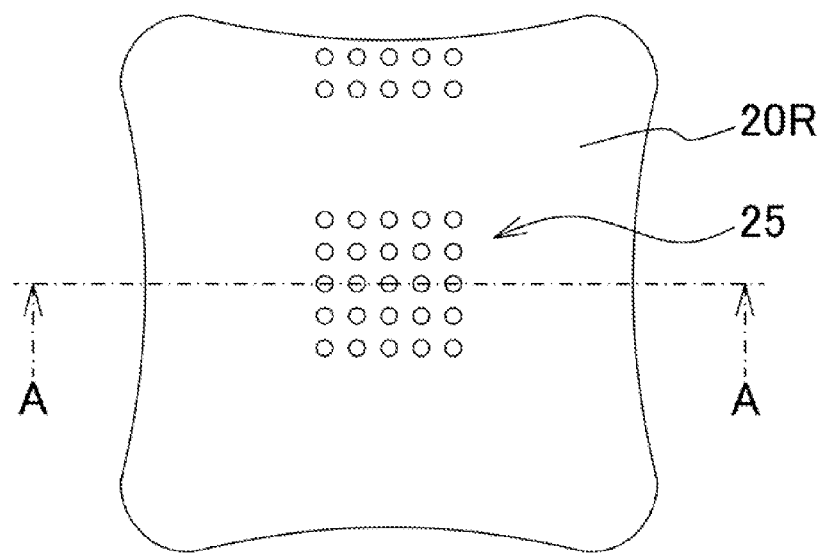
FIGS. 3A and 3B illustrate a hole group and associated peripheral elements.
Figure 3B:
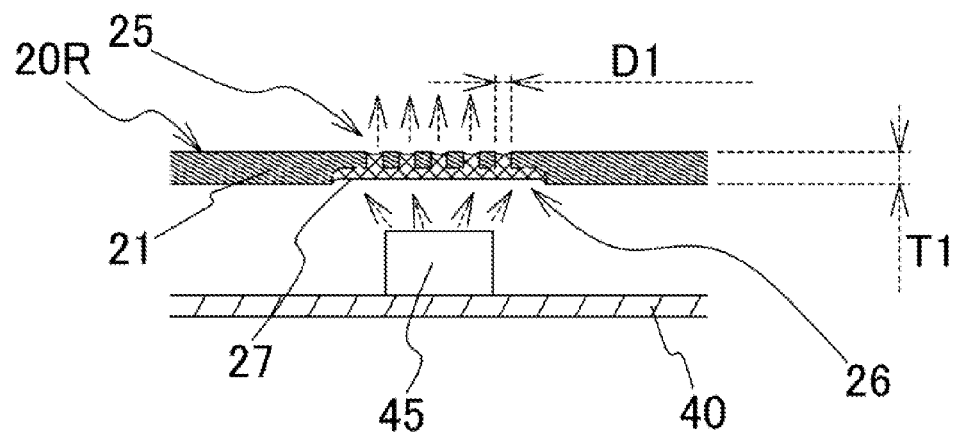

FIGS. 3A and 3B illustrate an example of one of the hole groups 25 and peripheral elements.

FIG. 3A is a front view of the hole group 25, and FIG. 3B is a cross-sectional view taken along the line A in FIG. 3A.

Referring to FIG. 3A, the hole group 25 includes a plurality of holes arranged in a rectangular region. Alternatively, the plurality of holes of a hole group may be arranged such that the periphery of the hole group has any other polygonal, circular and/or ovular shape, for example.

Referring to FIG. 3B, rear panel 20R includes a panel body 21 and can accept a sealant 27.

The panel body 21 has a thickness T1 of about 0.3 mm.

The panel body 21 includes hole groups 25 and recesses 26.

The recesses 26 are provided on a side of the panel body 21 facing LEDs 45. As shown in FIG. 3B, the panel body 21 includes a recess 26 within a recessed region corresponding to the hole group 25. The thickness of the panel body 21 in the recessed region of the panel body 21 is less than the thickness T1 of the panel body 21 in a region other than the recessed region. For example, in FIG. 3B, the thickness within the recessed region of the panel body 21 corresponds to a value that is substantially equal to the thickness T1 minus a depth of the recess.

Hole groups 25 are provided on rear panel 20R in corresponding recesses 26.

That is, hole groups 25 and recesses 26 are provided at positions that are to be illuminated with the light from LEDs 45, for example.

The recesses 26 may be filled with a sealant 27.

That is, hole groups 25 may be sealed with sealant 27.

Sealant 27 is optically translucent or optically transparent. Moreover, sealant 27 may be thermosetting resin, for example.

The panel body 21 is may be made of a metal that is not optically transparent.

That is, the panel body 21 and sealant 27 may have different optical transparencies.

The difference in optical transparency between the panel body 21 and sealant 27 enhances the appearance of the state of light emitted from LEDs 45 through hole groups 25.

Thus, the aesthetic appearance of mobile phone 1 is improved.

Because hole groups 25 are sealed with sealant 27, water is impeded and/or prevented from entering the interior of casing 20 through hole groups 25.

Sealant 27 is provided in the recesses 26 of the panel body 21.

Therefore, sealant 27 does not protrude from the panel body 21 in the thickness direction of the panel body 21.

Thus, the thickness of the rear panel 20R may be reduced, and the thickness of the mobile phone 1 is also minimized.

Since sealant 27 is hardened, reduction in the strength at and around the recesses 26 and hole groups 25 is inhibited.

Sealant 27 may fill at least one of the holes included in each of hole groups 25.

That is, the holes of hole groups 25 are sealed with sealant 27.

Therefore, dust is also inhibited and/or prevented from accumulating in the holes.

Thus, the occurrence of differences in the optical transparency between the holes is minimized.

Consequently, the aesthetic appearance of mobile phone 1 is enhanced.

In addition, when, for example, the outer surface of rear panel 20R is painted, paint is prevented from flowing into the holes of hole groups 25 when the holes are sealed with a sealant.

Thus, the aesthetics of hole groups 25 are improved.

Although the holes of hole groups 25 each have a diameter D1 of about 0.1 to 0.15 mm, for example, the diameter D1 is not limited thereto.

When the panel body 21 is provided with recesses 26 that are filled with sealant 27 to seal hole groups 25, the thickness of the rear panel 20R is reduced. Moreover, rear panel 20R is thus waterproofed.

If the area of the panel body 21 excluding the recesses 26 is reduced, the plan-view size of the panel body 21 is also reduced.

Figure 4:
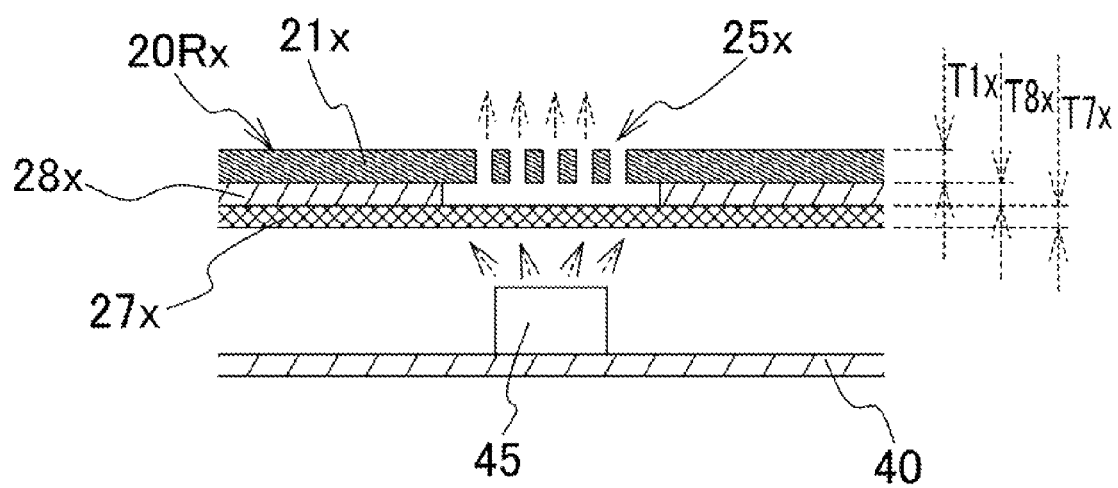
FIG. 4 illustrates a panel having a different configuration than a panel according to the embodiment of FIGS. 1A to 3B.

FIG. 4 illustrates a rear panel 20Rx different than the rear panel 20R according to the embodiment described in FIGS. 1A-3B.

Rear panel 20Rx includes a panel body 21x provided with hole groups 25x.

Unlike rear panel 20R according to the embodiment discussed above, panel body 21x has no recesses 26.

To impede and/or prevent water from entering through hole groups 25x, a transparent sheet 27x is pasted to the inner surface of panel body 21x.

Transparent sheet 27x is pasted to panel body 21x with double-sided tape 28x.

As shown in FIG. 4, the double-sided tape 28x is positioned such that those regions corresponding to hole groups 25x are not blocked from receiving light emitted from LEDs 45.

Panel body 21x has a thickness T1x of about 0.3 mm, the double-sided tape 28x has a thickness T8x of about 0.2 mm, and the transparent sheet 27x has a thickness T7x of about 0.2 mm.

Therefore, the rear panel 20Rx has a total thickness of about 0.7 mm, for example.

Thus, waterproofing rear panel 20Rx increases the total thicknesses of rear panel 20Rx due to the thickness of transparent sheet 27x and the double-sided tape 28x.

Moreover, dust or the like may accumulate in the holes of hole groups 25x, producing differences in optical transparency between the holes.

Consequently, the aesthetic appearance of the mobile phone 1 may be reduced.

Furthermore, if the outer surface of panel body 21x is painted, paint may flow into the holes of hole groups 25x.

Consequently, the diameters of the holes may appear different from each other, deteriorating the aesthetics thereof.

Because the double sided tape 28x may have an adverse influence on the light traveling through the holes of the hole groups 25x, the regions of the double-sided tape 28x corresponding to the hole groups 25x are removed.

That is, the region of the panel body 21x to which the double-sided tape 28x is pasted only includes the region excluding the hole groups 25x.

Therefore, panel body 21x includes regions having hole groups 25x and regions to which the double-sided tape 28x is applied.

Consequently, the reduction in the size of the panel body 21x is problematic when double-sided tape 28x is used.

If the size of the region of panel body 21x to which the double-sided tape 28x is to be applied is decreased, then the effectiveness of the adhesiveness of the double-sided tape 28x may be reduced.

In that case, the double-sided tape 28x may peel away from or unstick from panel body 21x or transparent sheet 27x.

Suppose that waterproofing casing 20 is provided by pasting a sheet-like member, instead of providing resin, to the recesses 26 of panel 20R according to the embodiment illustrated in FIGS. 1A-3B.

When a sheet-like member is pasted to recesses 26 in such a manner as to cover hole groups 25, the sheet-like member adheres to the panel body 21 on the peripheries of the holes of hole groups 25 but does not adhere to the panel body 21 inside of the holes.

Therefore, the adhesive effectiveness of the sheet-like member is reduced, and the sheet-like member may peel off of recesses 26.

If the sheet partially peels off, then the effectiveness of the waterproofing is deteriorated.

To reduce and/or minimize such situations, sufficient contact areas between the sheet-like member and recesses 26 should be provided, that is, the size of the recesses 26 would likely be increased.

Consequently, the plan-view size of the panel body 21 may not be able to be reduced.

A method of manufacturing the illumination device shown in FIGS. 1A to 3B is described below.

FIGS. 5A to 5C and 6A to 6C illustrate a method of manufacturing the illumination device shown in FIGS. 1A to 3B.

Figure 5A:
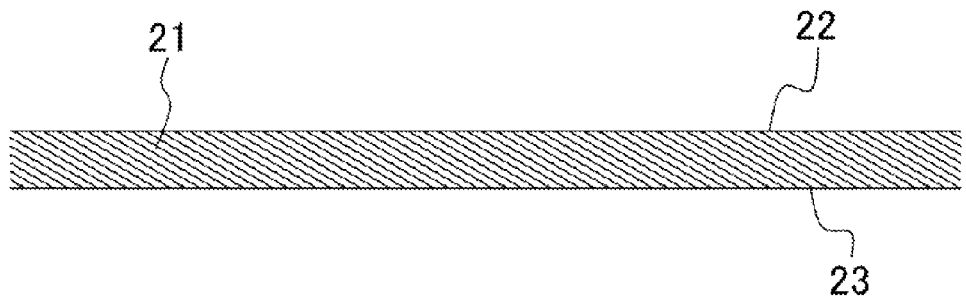
FIGS. 5A to 5C illustrate a method of manufacturing an illumination device.
Figure 5B:
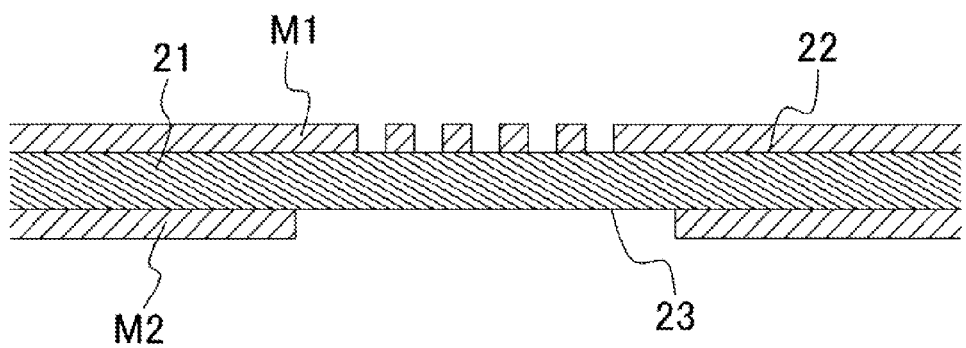

Referring to FIGS. 5A and 5B, a mask M1 having a plurality of holes for providing hole groups 25 is placed on an outer surface 22 of the panel body 21.

A mask M2 is placed on an inner surface 23 of panel body 21 in order to form recesses 26.

Subsequently, panel body 21 is wet-etched with etchant.

Figure 5C:
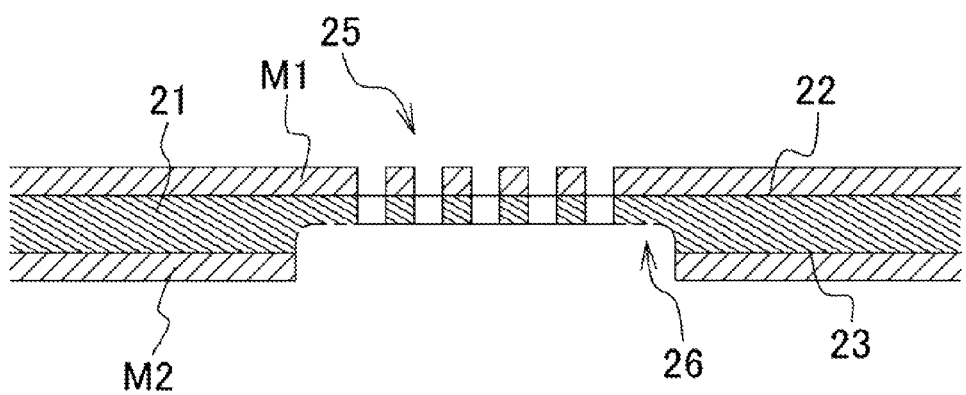

Thus, referring to FIG. 5C, regions of panel body 21 that are not covered with masks M1 and M2 are etched, whereby hole groups 25 and recesses 26 are formed in the panel body 21.

The wet etching may be performed by a dipping method in which panel body 21 is dipped in etchant contained in a container.

The wet etching may alternatively be performed by a spraying method in which a chemical is sprayed on the regions of the panel body 21 that are to be etched.

The wet etching may alternatively be performed by a spin method in which panel body 21 is attached to a rotatable table called a spinner used to provide a chemical onto panel body 21.

Figure 6A:
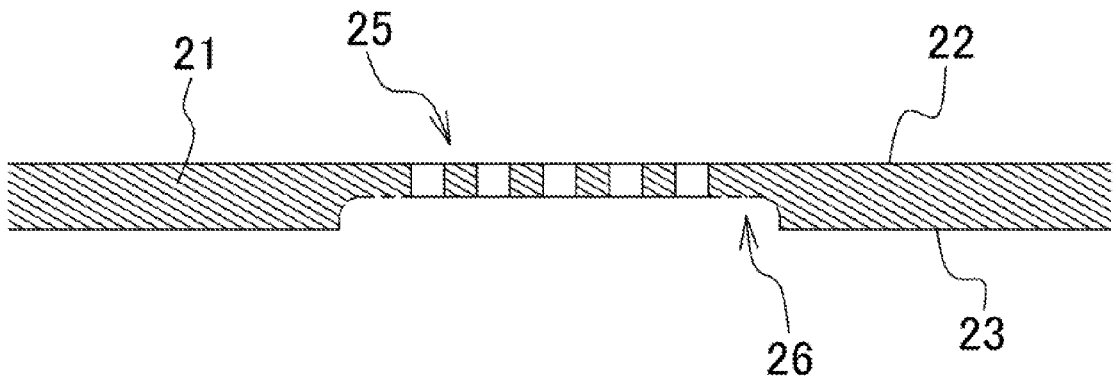
FIGS. 6A to 6D further illustrate the method of manufacturing an illumination device.

Subsequently, referring to FIG. 6A, masks M1 and M2 are removed from panel body 21.

Figure 6B:
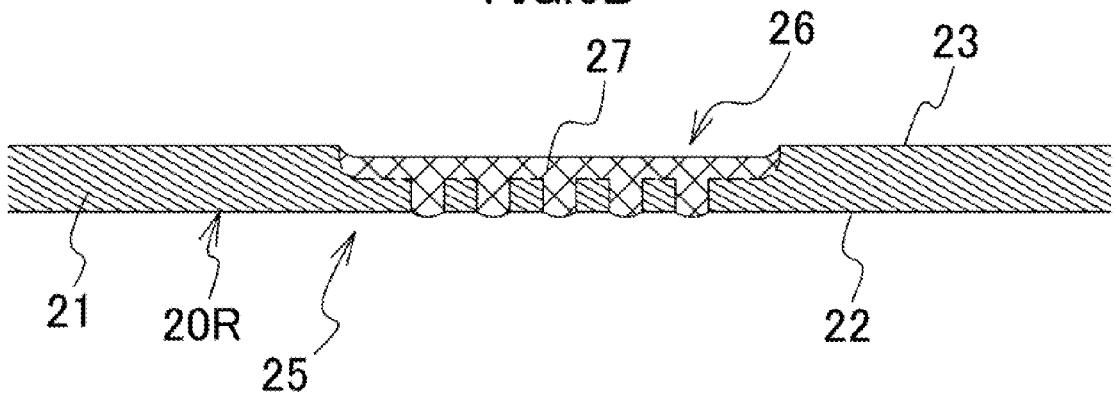

Subsequently, referring to FIG. 6B, panel body 21 is turned over so that the inner surface 23 thereof becomes face up, and sealant 27 is provided into the recesses 26 by using a dispenser.

The sealant 27 does not flow out of the holes of hole groups 25 due to the surface tension of sealant 27.

That is, the size of the holes of hole groups 25 are set by considering the viscosity, surface tension, and the like of sealant 27 so that sealant 27 does not flow out of the holes.

After sealant 27 is provided in recess 26, the entirety of panel body 21 is heated, whereby sealant 27 is hardened with the heat.

Thus, rear panel 20R is obtained.

Figure 6C:
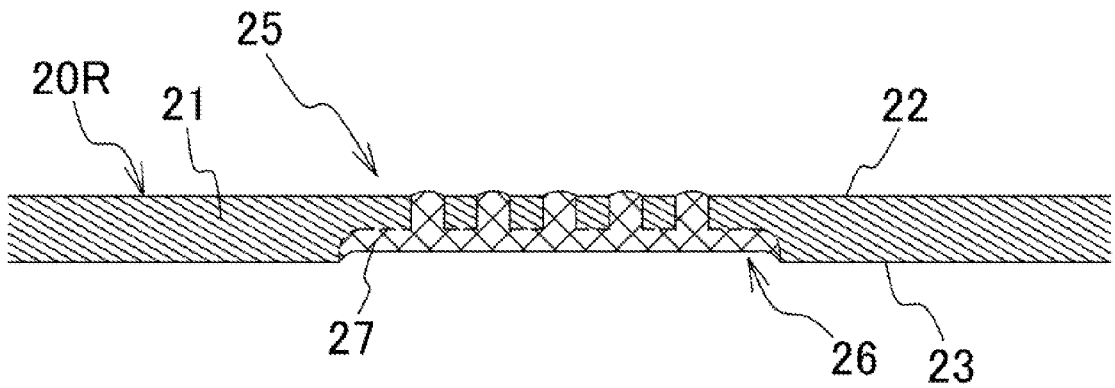
Figure 6D:
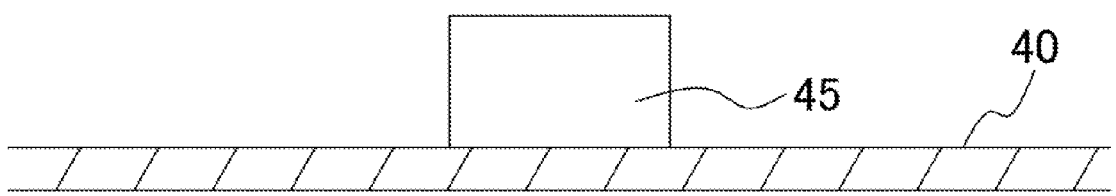

Subsequently, referring to FIG. 6C, rear panel 20R is assembled with front panel 20F so that the light emitted from LEDs 45 is applied toward recesses 26 and hole groups 25.

Thus, the illumination device housed in casing 20 is obtained.

The electronic apparatus shown in FIGS. 1A to 1B is not limited to mobile phones.

For example, the electronic apparatus may be a personal digital assistant (PDA) or a notebook personal computer.

The electronic apparatus may be either a mobile apparatus or a desktop apparatus.

Although sealant 27 described in the embodiment is a thermosetting resin, the sealant 27 may be an ultraviolet-curable resin, for example.

Although the light emitters in described the embodiment are LEDs 45, the light emitters may also be incandescent lamps, fluorescent lamps, or the like.

Although hole groups 25 are provided in rear panel 20R in the embodiment, holes to be illuminated with light from the light emitters may be provided in at least one of front panel 10F, front panel 20F, and rear panel 10R.

Rear panel 20R may have only a single hole.

Although panel body 21 in the embodiment is made of a metal that is not optically transparent, the panel body 21 may be made of a synthetic resin having optical transparency.

That is, the material of panel body 21 is not limited, as long as panel body 21 and sealant 27 have different optical transparencies.

If panel body 21 and sealant 27 have different optical transparencies, then the appearance of the light emitted from LEDs 45 directed at and around hole groups 25 is different between panel body 21 and sealant 27, enhancing the aesthetic appearance of mobile phone 1.

For example, the panel body 21 may have a greater optical transparency than sealant 27.

In that case, the amount of light emitted from LEDs 45 that is transmitted through the holes of hole groups 25 is reduced, whereby the holes of hole groups 25 illuminated with the light emitted from LEDs 45 appear in silhouette.

When panel body 21 is made of synthetic resin, the panel body 21 is manufactured as described below.

Panel body 21 is prepared by injection molding with a mold that allows the recesses 26 to be provided without wet-etching.

After panel body 21 having recesses 26 is obtained, the hole groups 25 are provided in the recesses 26 by hole punching or the like.

Subsequently, sealant 27, which is curable with ultraviolet rays, for example, is provided into the recesses 26, and is hardened by applying ultraviolet rays to sealant 27.

When panel body 21 is made of metal, the method by which hole groups 25 and recesses 26 are provided is not limited to wet etching and may be formed by dry etching.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. An illumination device comprising:
   a light emitter; and
   a panel including
      a recess configured to accept an optically transparent sealant to be illuminated by light from the light emitter, the recess provided on a first surface of the panel, the first surface facing the emitter, and
      a hole provided in the recess and sealed by the sealant, the hole penetrating from the first surface to a second surface of the panel, the second surface being opposite the first surface.

2. The illumination device according to claim 1, wherein the sealant fills the hole.

3. The illumination device according to claim 1, wherein the panel and the sealant have different optical transparencies.

4. The illumination device according to claim 1, wherein the panel is a portion of a casing that houses the light emitter.

5. The illumination device according to claim 4, wherein the sealant provides a water-tight seal preventing water from entering the casing via the hole.

6. The illumination device according to claim 1, wherein the panel includes a plurality of holes in the recess.

7. The illumination device according to claim 1, wherein the panel includes a plurality of recesses and a plurality of holes in each of the recesses.

8. The illumination device according to claim 1, wherein a thickness of the panel in the recess is thinner than a thickness of the panel in a region other than the recess.

9. The illumination device according to claim 8, wherein the sealant is provided within the hole such that a thickness of the optically transparent sealant does not exceed a thickness of the panel in a region other than the recess.

10. The illumination device according to claim 1, wherein the size of the hole is set based on at least one of viscosity and surface tension of the sealant.

11. An electronic apparatus comprising:
    an illumination device including,
       a light emitter; and
       a panel, the panel including,
          a recess configured to accept an optically transparent sealant to be illuminated by light from the light emitter, the recess provided on a first surface of the panel, the first surface facing the emitter, and
          a hole provided in the recess and sealed by the sealant, the hole penetrating from the first surface to a second surface of the panel, the second surface being opposite the first surface.

12. A method of manufacturing an illumination device, comprising:
    providing a recess on a first surface of a panel;
    providing a hole in the recess, the hole penetrating from the first surface to a second surface of the panel;
    sealing the hole by filling the recess with an optically transparent sealant; and
    positioning the panel to receive light in the recess that is illuminated from a light emitter, wherein
    the first surface of the panel faces the light emitter.

13. The method of manufacturing an illumination device according to claim 12, wherein the resin is impeded from flowing out of the hole while the resin is being received within the recess and cured.

14. The method of manufacturing according to claim 12, wherein the size of the hole is set based on at least one of viscosity and surface tension of the resin.

* * * * *